(12) United States Patent
Kim et al.

(10) Patent No.: US 11,209,874 B2
(45) Date of Patent: Dec. 28, 2021

(54) DISPLAY DEVICE

(71) Applicant: Samsung Display Co., Ltd., Yongin-si (KR)

(72) Inventors: ChangBum Kim, Pyeongtaek-si (KR); Youngsik Kim, Yongin-si (KR); Jiyeon Baek, Osan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/071,990

(22) Filed: Oct. 15, 2020

(65) Prior Publication Data

US 2021/0132666 A1    May 6, 2021

(30) Foreign Application Priority Data

Nov. 4, 2019  (KR) .......................... 10-2019-0139547

(51) Int. Cl.
  *G06F 1/16*     (2006.01)
  *G02B 1/11*     (2015.01)
(52) U.S. Cl.
  CPC .............. *G06F 1/1684* (2013.01); *G02B 1/11* (2013.01); *G06F 1/1609* (2013.01); *G06F 1/1637* (2013.01)
(58) Field of Classification Search
  CPC ........ G06F 1/1637; G06F 1/1684; G02B 1/11
  See application file for complete search history.

(56) References Cited

U.S. PATENT DOCUMENTS

| | | | |
|---|---|---|---|
| 2006/0257589 A1* | 11/2006 | Hayashi | .................... C08B 3/16 428/1.2 |
| 2008/0233312 A1* | 9/2008 | Nakamura | ............. G02B 1/105 428/1.31 |
| 2013/0147742 A1 | 6/2013 | Lee | |
| 2014/0016043 A1* | 1/2014 | Chen | .................. G02F 1/133308 349/12 |
| 2014/0022639 A1* | 1/2014 | Yabuhara | .................. G02B 5/30 359/488.01 |
| 2014/0226210 A1* | 8/2014 | Moriwaki | ................ G02B 5/02 359/601 |
| 2015/0131035 A1* | 5/2015 | Chen | ........................ G02B 1/11 349/96 |
| 2016/0154157 A1* | 6/2016 | Cho | ........................ G02B 1/14 359/489.07 |
| 2018/0204040 A1* | 7/2018 | Kwon | ................... G06F 3/0421 |

(Continued)

FOREIGN PATENT DOCUMENTS

| | | |
|---|---|---|
| JP | 3182347 | 4/1998 |
| KR | 10-1103535 | 1/2012 |

(Continued)

*Primary Examiner* — Adrian S Wilson
(74) *Attorney, Agent, or Firm* — H.C. Park & Associates, PLC

(57) ABSTRACT

A display device includes a display panel to display an image; an input sensor disposed on the display panel; a flexible circuit board attached to the input sensor; a compensation film disposed on the input sensor and spaced apart from the flexible circuit board; and an anti-reflector disposed on the flexible circuit board and the compensation film. The compensation film has a thickness is greater than that of the flexible circuit board and less than or equal to a distance between the anti-reflector and the input sensor.

24 Claims, 14 Drawing Sheets

(56) References Cited

U.S. PATENT DOCUMENTS

| | | | |
|---|---|---|---|
| 2018/0364835 A1 | 12/2018 | Kwon et al. | |
| 2019/0044093 A1* | 2/2019 | Sargent | G06F 1/1601 |
| 2019/0334128 A1* | 10/2019 | Kim | H01L 51/0097 |
| 2021/0004094 A1* | 1/2021 | Jeong | G06F 3/0412 |

FOREIGN PATENT DOCUMENTS

| | | |
|---|---|---|
| KR | 10-2013-0066395 | 6/2013 |
| KR | 10-2015-0001410 | 1/2015 |
| KR | 10-2018-0137748 | 12/2018 |

\* cited by examiner

DISPLAY DEVICE

CROSS-REFERENCE TO RELATED APPLICATION

This application claims priority from and the benefit of Korean Patent Application No. 10-2019-0139547, filed on Nov. 4, 2019, which is hereby incorporated by reference for all purposes as if fully set forth herein.

BACKGROUND

Field

Exemplary implementations of the invention relate to a display device, and more particularly, to a display device having a bezel area with a small width.

Discussion of the Background

Electronic products, e.g., smart phones, tablets, notebook computers, and smart televisions, have been developed. Each of the electronic products may include a display device for displaying information. The electronic products may further include various display modules. The display device may include an input sensing panel as an input unit. The input sensing panel may be disposed on a display panel for displaying an image. The input sensing panel may be used to detect external information.

The above information disclosed in this Background section is only for understanding of the background of the inventive concepts, and, therefore, it may contain information that does not constitute prior art.

SUMMARY

Applicant realized that in a display device having a flexible circuit board connected between the layers of the display panel, an air gap may be non-uniformly and irregularly formed between the layers due to the thickness of the flexible circuit board. The bezel area of the display device may have to be increased in width to cover the air gap, which reduces the available space for the display area.

Display devices constructed according to the principles and exemplary implementations of the invention reduce the air gap caused by connection of a flexible circuit board and thereby minimize the thickness of the bezel area of the display devices. For example, when a compensation film, such as a reinforcement film, is disposed between the layers to which the flexible circuit board is connected, such as the input sensing panel and an anti-reflective layer, the air gap is formed at a predetermined position and has a constant shape. Accordingly, the bezel area does not be increased in width to cover the air gap GP, and the transmission area may be increased such that the display device has a wider display area.

According to one aspect of the invention, a display device includes: a display panel to display an image; an input sensor disposed on the display panel; a flexible circuit board attached to the input sensor; a compensation film disposed on the input sensor and spaced apart from the flexible circuit board; and an anti-reflector disposed on the flexible circuit board and the compensation film. The compensation film may have a thickness is greater than that of the flexible circuit board and less than or equal to a distance between the anti-reflector and the input sensor.

The input sensor may include a pad to electrically connect to the flexible circuit board, and the thickness of the compensation film may be substantially the same as the sum of the thickness of the flexible circuit board and a thickness of the pad.

The compensation film may include a reinforcement layer that optionally includes an optically clear adhesive.

The anti-reflector may include a polarizing layer.

The input sensor may include: a base layer; a conductive layer disposed on the base layer; and an insulating layer covering the conductive layer.

The input sensor may have a thickness of about 20 μm to about 45 μm.

The thickness of the compensation film may be less than or equal to that of the input sensor.

The input sensor may include a pad for electrically connecting with the flexible circuit board.

The pad may include a portion overlapping the flexible circuit board and another portion overlapping the compensation film.

The display device may further include a window on the anti-reflector.

The window may include a window light blocking pattern disposed on a rear surface of the window, and the window light blocking pattern may overlap the flexible circuit board.

The compensation film partially may overlap the window light blocking pattern.

The compensation film may not overlap the window light blocking pattern.

The display device may further include an adhesive layer between the display panel and the input sensor to bond the input sensor to the display panel.

The input sensor may have a top surface to which the flexible circuit board is attached and on which the compensation film is disposed.

The display device may further include a protective layer between the compensation film and the input sensor.

The compensation film may include a reinforcement film that includes an optically clear adhesive.

The anti-reflector may include a polarizing layer.

The display device may include a window on the anti-reflector.

The display device may further include an adhesive layer between the display panel and the input sensor to bond the input sensor to the display panel.

According to another aspect of the invention, a display device includes: a display panel to display an image; an input sensor disposed on the display panel; a flexible circuit board attached to the input sensor; a compensation film on the input sensor and spaced apart from the flexible circuit board; an anti-reflector disposed on the flexible circuit board and the compensation film; and a window including a window light blocking pattern disposed on the anti-reflector. An end of the flexible circuit board and an end of the compensation film may be spaced apart from each other by a gap, and the window light blocking pattern at least partially overlaps the compensation film.

The gap may have a substantially constant size.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1A:
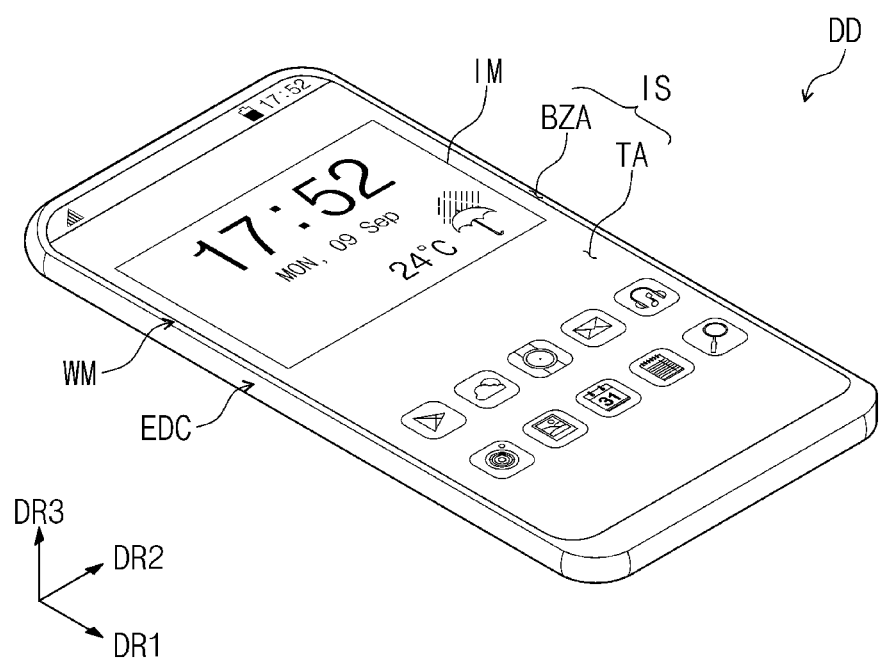
FIG. 1A is a perspective view of an exemplary embodiment of a display device constructed according to the principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, exemplary embodiments of the invention will be described with reference to the accompanying drawings.

Figure 1B:
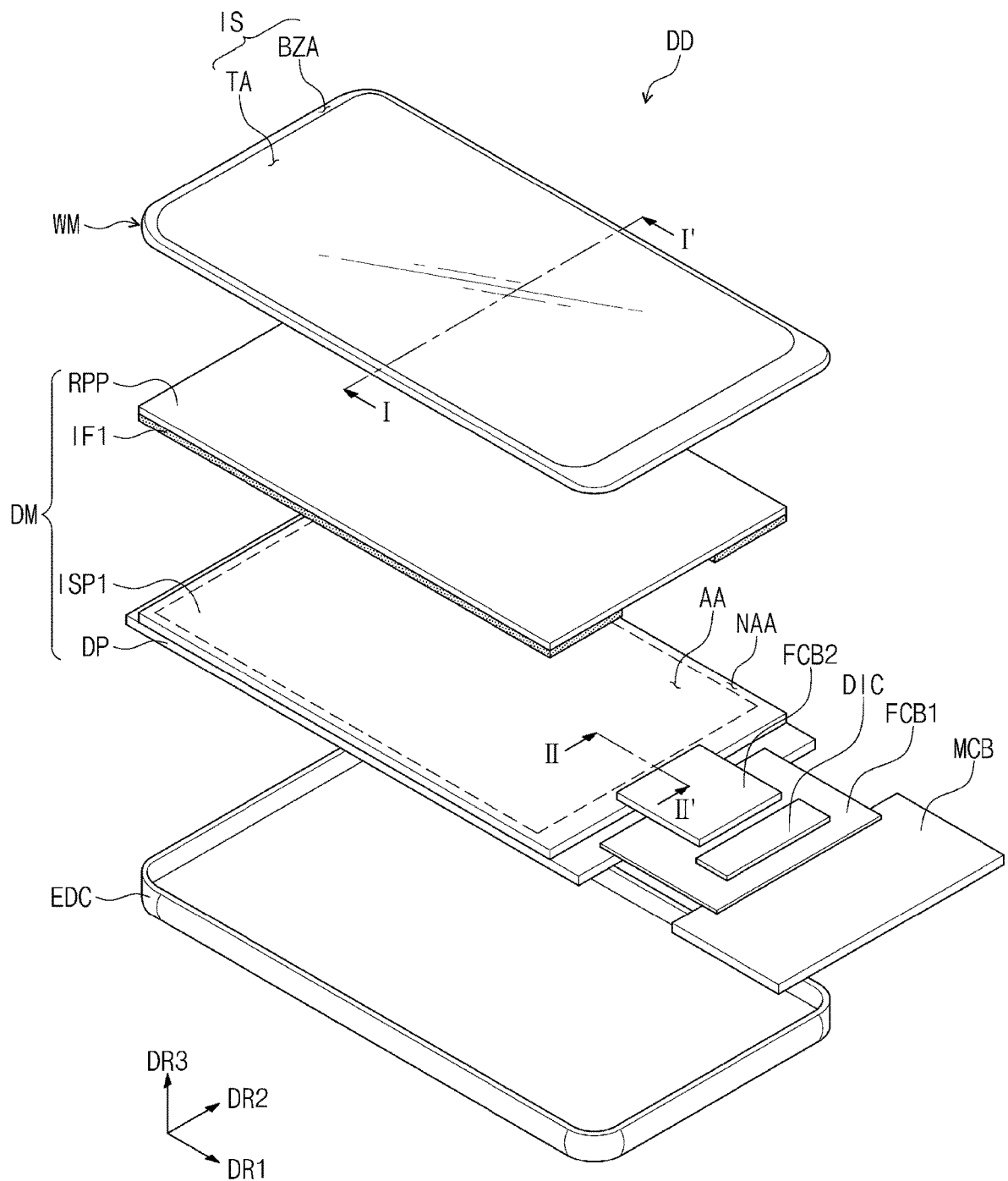
FIG. 1B is an exploded perspective view of the display device of FIG. 1A.

FIG. 1A is a perspective view of an exemplary embodiment of a display device constructed according to the principles of the invention, and FIG. 1B is an exploded perspective view of the display device of FIG. 1A.

Referring to FIGS. 1A and 1B, a display device DD may be a device that is activated according to an electrical signal. The display device DD may be implemented in various exemplary embodiments. For example, the display device DD may be applied to electronic devices such as a smart watch, a tablet, a notebook, a computer, a smart television, and the like.

The display device DD may display an image IM on a display surface IS in a third direction DR3. For example, the display surface IS may be generally parallel to each of first and second directions DR1 and DR2. The display surface IS on which the image IM is displayed may correspond to a front surface of the display device DD. The image IM may include a still image as well as a dynamic image.

In an exemplary embodiment, a front surface (or a top surface) or a rear surface (or a bottom surface) of each of elements/components may be defined based on a direction in which the image IM is displayed. The front and rear surfaces of each element may be opposite to each other in the third direction DR3. A normal direction of each of the front and rear surfaces of each element may be generally parallel to the third direction DR3.

The distance between the front and rear surfaces in the third direction DR3 may correspond to the thickness of the display device DD in the third direction DR3. The directions defined as the first to third directions DR1, DR2, and DR3 may be relative and changed to different directions.

The display device DD may sense or detect an external input applied from the outside. The external input may include various types of inputs provided from the outside of the display device DD. The external input applied from the outside may be provided in various manners.

For example, the external input may include an external input (for example, hovering) applied to be proximity to or adjacent by a predetermined distance to the electronic device DD as well as to contact a portion of the human body such as the user's hand. In addition, the external input may include various types such as force, a pressure, a temperature, light, and the like.

The front surface of the display device DD may include a transmission area TA and a bezel area BZA. The transmission area TA may be an area on which the image IM is displayed. A user may see the image IM through the transmission area TA. In an exemplary embodiment, each of vertices of the transmission area TA may have a rounded rectangular shape. Alternatively, the transmission area TA may have various other shapes. Further, the display device DD may have various other shapes.

The bezel area BZA may be adjacent to the transmission area TA. The bezel area BZA may have a predetermined color. The bezel area BZA may partially or completely surround the transmission area TA. Thus, the shape of the transmission area TA may be substantially defined by the bezel area BZA. For example, the bezel area BZA may be disposed adjacent to at least one side of the transmission area TA. Alternatively, the bezel area BZA may be omitted. Further, the display device DD may be implemented in various exemplary embodiments.

Referring to FIG. 1B, the display device DD may include a window WM, an external case EDC, and a display module DM. The display module DM may include a display panel DP, an input sensor in the form of an input sensing unit ISP1, an anti-reflector in the form of an anti-reflection unit RPP, and a compensation film in the form of a reinforcement film IF1.

The window WM may be made of a transparent material that is capable of emitting an image. For example, the window layer WM may be made of glass, sapphire, plastic, and the like. Although the window WM is provided as a single layer, the exemplary embodiments are not limited thereto. For example, the window WM may include a plurality of layers. The bezel area BZA of the display device DD may be formed by printing a material having a predetermined color on one area of the window WM.

The display panel DP according to an exemplary embodiment may be an emission type display panel, but is not limited thereto. For example, the display panel DP may be an organic light emitting display panel, a quantum-dot light emitting display panel, or the like. A light emitting layer of the organic light emitting display panel may include an organic light emitting material. A light emitting layer of the quantum dot light emitting display panel may include a quantum dot, a quantum rod, and the like. Hereinafter, the organic light emitting display panel will be described as an exemplary embodiment of the display panel DP for descriptive convenience.

The anti-reflection unit RPP reduces reflectance of external light incident from an upper side of the window WM. The anti-reflection unit RPP according to an exemplary embodiment may include, e.g., a retarder and a polarizer. The retarder may be a film type retarder or a liquid crystal coating type retarder and may include a $\lambda/2$ retarder and/or a $\lambda/4$ retarder. The polarizer may be a film type polarizer or a liquid crystal coating type polarizer. The film type may include an elongation-type synthetic resin, and the liquid crystal coating type may include liquid crystals arranged in a predetermined arrangement. The retarder and the polarizer may be implemented as a polarizing film. Further, the anti-reflection unit RPP may include a protective film disposed above or below the polarizing film.

The input sensing unit ISP1 may be disposed on the display panel DP. According to an exemplary embodiment, the input sensing unit ISP1 may be fixed on the display panel DP by an adhesive film. The anti-reflection unit RPP may be disposed on the input sensing unit ISP1. For example, the anti-reflection unit RPP may be disposed between the input sensing unit ISP1 and the window WM.

The display module DM may display an image according to an electrical signal and transmit/receive information through the external input. The front surface of the display panel DP may be divided into an active area AA and a peripheral area NAA. The active area AA may be defined as an area that emits the image provided from the display module DM.

The peripheral area NAA of the display panel DP may be adjacent to the active area AA of the display panel DP. For example, the peripheral area NAA of the display panel DP may completely surround the active area AA of the display panel DP. For example, the peripheral area NAA of the display panel DP may have various shapes. According to some exemplary embodiments, the active area AA of the display panel DP may correspond to at least a portion of the transmission area TA.

The display module DM may further include a main circuit board MCB, a first flexible circuit board FCB1, a second flexible circuit board FCB2, and a driving chip DIC. As used herein the term flexible circuit board means any type of flexible material, such as a substrate, film, printed circuit board, or other flexible material upon which circuitry and/or conduction wires may be supported to connect to electronic components.

The main circuit board MCB may be connected to the first flexible circuit board FCB1 and electrically connected to the display panel DP. The main circuit board MCB may include a plurality of driving elements. The plurality of driving elements may include a circuit is unit for driving the display panel DP.

The first flexible printed circuit board FCB1 may be connected to the display panel DP, and may electrically connect the display panel DP to the main circuit board MCB. The driving chip DIC may be mounted on the first flexible circuit board FCB1.

The driving chip DIC may include driving elements for driving pixels of the display panel DP. For example, the driving elements may include a data driving circuit. The first flexible circuit board FCB1 according to an exemplary embodiment may be a single circuit board. Alternatively, the first flexible circuit board FCB1 may include a plurality of circuit boards and connected to the display panel DP.

The second flexible circuit board FCB2 may include a circuit unit for controlling the input sensing unit ISP1. In an exemplary embodiment, the main circuit board MCB may include a circuit unit for controlling the input sensing unit ISP1. For example, the main circuit board MCB may be connected to the second flexible circuit board FCB2 and electrically connected to the input sensing unit ISP1.

The external case EDC may accommodate the display module DM. The external case EDC may be bonded to the window WM. For example, an outer appearance of the display device DD may be defined by the external case EDC and the window WM. The external case EDC may absorb an impact applied from the outside and prevent foreign materials or moisture from being permeated into the display module DM to protect the components accommodated in the external case EDC. In an exemplary embodiment, the external case EDC may have a form in which a plurality of separate spaces for accommodating items is bonded to each other.

The display device DD according to an exemplary embodiment may include an electronic module, a power supply module, and a bracket. For example, the electronic module may include various functional modules for driving the display module DM. The power supply module may supply power for the overall operation of the display device DD. The bracket may be bonded to the display module DM and/or the external case EDC to divide an internal space of the display device DD.

Figure 2A:
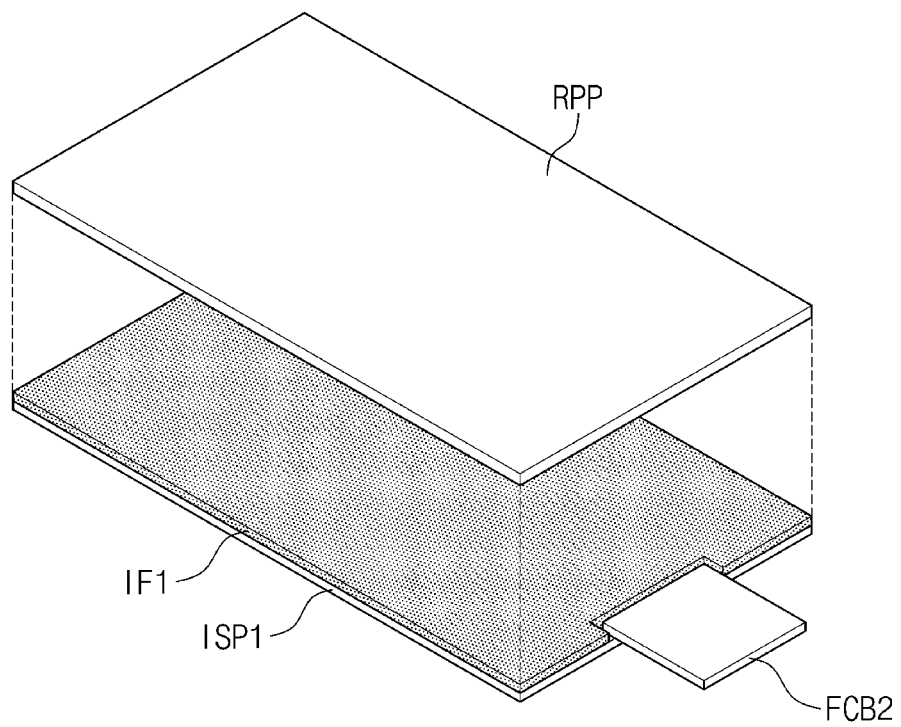
FIG. 2A is a perspective view illustrating the positional relationship of the input sensing unit, anti-reflection unit, reinforcement film, and flexible circuit board of FIG. 1B.
Figure 2B:
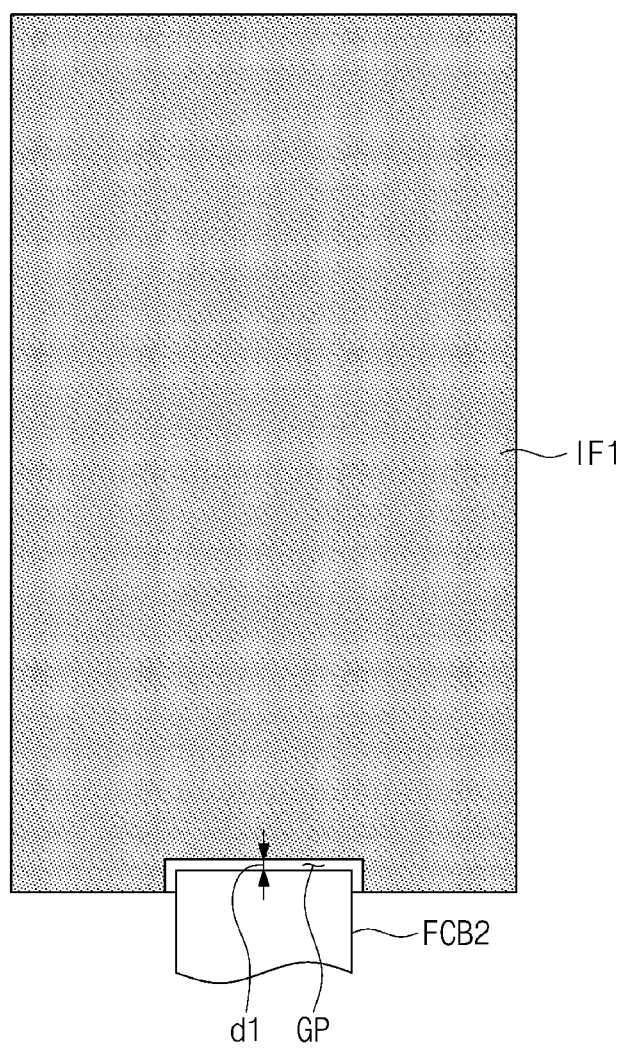
FIG. 2B is a plan view of the reinforcement film and the flexible circuit board of FIG. 1B.
Figure 3A:
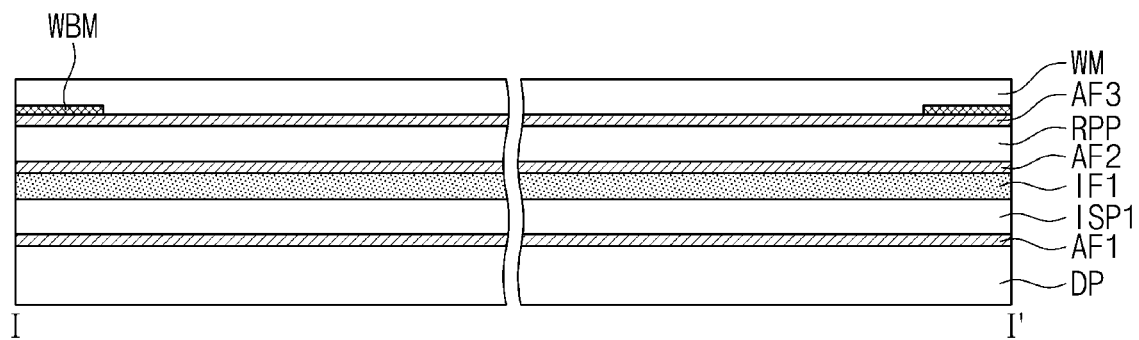
FIG. 3A is a cross-sectional view taken along line I-I' of FIG. 1B.
Figure 3B:
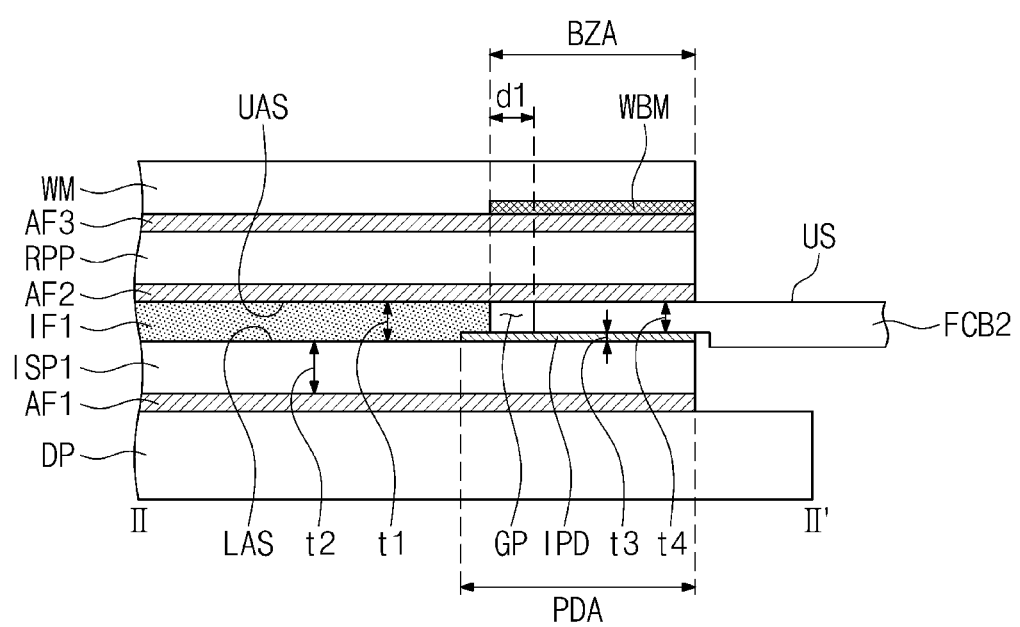
FIG. 3B is a cross-sectional view taken along line II-IF of FIG. 1B according to an exemplary embodiment of the invention.

FIG. 2A is a perspective view of the input sensing unit ISP1, the anti-reflection unit RPP, the reinforcement film IF1, and the second flexible circuit board FCB2 of FIG. 1B. FIG. 2B is a plan view of the reinforcement film IF1 and the second flexible circuit board FCB2. FIG. 3A is a cross-sectional view taken along line I-I' of FIG. 1B. FIG. 3B is a cross-sectional view taken along line II-IF of FIG. 1B.

Referring to FIGS. 2A to 3B, the input sensing unit ISP1 may be provided separately from the display panel DP. For example, the input sensing unit ISP1 may be an input sensing panel bonded to the display panel DP by a first adhesive film AF1.

A reinforcement film IF1 may be attached to the top surface of the input sensing panel ISP1. A plurality of pads IPD bonded to the second flexible circuit board FCB2 may be disposed at one side of the top surface of the input sensing panel ISP1. For example, an area on which the pads IDP are disposed may be defined as a pad area PDA. For example, the reinforcement film IF1 may be disposed on the top surface of the input sensing panel ISP1 except for a region adjacent to the pad area PDA of the input sensing panel ISP1.

The input sensing panel ISP1 may be bonded to the second flexible circuit board FCB2 on the pad area PDA. The reinforcement film IF1 may be disposed to cover the top surface of the input sensing panel ISP1 on the remaining area of the input sensing panel ISP1 except for region adjacent the pad area PDA. For example, the reinforcement film IF1 may not overlap the second flexible circuit board FCB2. In an exemplary embodiment, the reinforcement film IF1 may be spaced apart from the second flexible circuit board FCB2 by a predetermined distance. The spaced distance between the reinforcement film IF1 and the second flexible circuit board FCB2 may be defined as a first distance d1. For example, the reinforcement film IF1 may be directly adjacent to and contact the second flexible circuit board FCB2 in a horizontal direction, or may be spaced apart from the second flexible circuit board FCB2 in the horizontal direction.

An air gap GP may be disposed between an end of the reinforcement film IF1 and an end of the second flexible circuit board FCB2 by the first distance d1. Since the reinforcement film IF1 is constantly maintained at the first distance d1 from an end of the second flexible circuit board FCB2, the air gap GP may have a substantially constant size along the end of the second flexible circuit board FCB2.

In an exemplary embodiment, the reinforcement film IF1 may include an optically clear adhesive (OCA). For example, since the reinforcement film IF1 has adhesiveness, an additional adhesive film may not be required to bond the reinforcement film IF1 to the top surface of the input sensing panel ISP1. For example, the reinforcement film IF1 may be directly attached to the top surface of the input sensing panel ISP1.

In an exemplary embodiment, the reinforcement film IF1 may be formed of materials that are transparent and adhesive. For example, when the reinforcement film IF1 is attached on the input sensing panel ISP1 by a laminating method, the reinforcement film IF1 may be formed of any material that is optically transparent.

The anti-reflection unit RPP may be disposed on the reinforcement film IF1. The gap overlaps with the anti-reflection unit RPP. In an exemplary embodiment, the anti-reflection unit RPP may include a polarizing film. For example, the anti-reflection unit RPP may further include a protective film and other functional films. Hereinafter, only the polarizing film is shown for convenience of description, and the polarizing film and the anti-reflection unit RPP are expressed by the same reference numeral. A second adhesive film AF2 may be disposed between the polarizing film RPP and the reinforcement film IF1. For example, the polarizing film RPP may be bonded to the reinforcement film IF1 by the second adhesive film AF2. The top surface of the reinforcement film IF1 may be bonded to the second adhesive film AF2, and a bottom surface of the reinforcement film IF1 may be bonded to the top surface of the input sensing panel ISP1.

Referring to FIGS. 2A and 3B, the polarizing film RPP may cover the reinforcement film IF1, and the polarizing film RPP may cover the top surface US of the second flexible circuit board FCB2 disposed on the pad area PDA. That is, the polarizing film RPP may partially overlap the second flexible circuit board FCB2. For example, the polarizing film RPP may entirely cover the reinforcement film IF1.

In an exemplary embodiment, the reinforcement film IF1 may have a first thickness t1. For example, the first thickness t1 of the reinforcement film IF1 may be greater than a fourth thickness t4 of the second flexible circuit board FCB2 and may less than or equal to the distance between the polarizing film RPP and the input sensing panel ISP1. For example, the fourth thickness t4 of the second flexible circuit board FCB2 may be the thickness of the second flexible circuit board FCB2 on the pad area PDA. For example, the top surface of the reinforcement film IF1 and the top surface US of the second flexible circuit board FCB2 on the pad area PDA may be substantially coplanar in a horizontal direction.

In an exemplary embodiment, the first thickness t1 may be substantially equal to the sum of the fourth thickness t4 of the second flexible circuit board FCB2 and a third thickness t3 of the pad IPD. For example, the distance from the top surface US of the second flexible circuit board FCB2 to the top surface of the input sensing panel ISP1 on the pad area PDA may be substantially the same as the first thickness t1 of the reinforcement film IF1. In an exemplary embodiment, the first thickness t1 of the reinforcement film IF1 may be about 20 μm to about 30 μm.

In an exemplary embodiment, the input sensing panel ISP1 may have a second thickness t2. The second thickness t2 of the input sensing panel ISP1 may be about 20 μm to about 45 μm.

Referring to FIG. 3B, the distance between the bottom surface of the polarizing film RPP and the top surface of the input sensing panel ISP1 may be constantly maintained on the pad area PDA and the remaining area except for the pad area PDA. For example, when a stepped portion is formed on the input sensing panel ISP1 by the second flexible circuit board FCB2, the reinforcement film IF1 may maintain a constant distance between the bottom surface of the polarizing film RPP and the top surface of the input sensing panel ISP1.

Further, the air gap GP between the polarizing film RPP and the input sensing panel ISP1 may be defined between the end of the reinforcement film IF1 and the end of the second flexible circuit board FCB2. For example, a position of the air gap GP may be constantly maintained by the reinforcement film IF1 such that the air gap GP may have a uniform or regular form. When the reinforcement film IF1 is not provided, the air gap GP may be non-uniformly and irregularly formed between the polarizing film RPP and the input sensing panel ISP1. In this case the bezel area BZA must be increased in width to cover the air gap GP. However, when the air gap GP is defined at a predetermined position by the reinforcement film IF1, the bezel area BZA does not need to be increased in width to cover the air gap GP, and actually may be reduced in width. Thus, with the substantially constant air gap according to the principles and exemplary embodiments of the invention, the transmission area TA of the display device DD may be increased such that the display device DD may have a wider display area.

The window WM may be bonded onto the anti-reflection unit RPP through the third adhesive film AF3. The window WM may include a window light blocking pattern WBM that defines the bezel area BZA. The window light blocking pattern WBM may be formed of e.g., a colored organic film, by a coating method.

Referring to FIG. 3B, the end of the reinforcement film IF1 may be positioned in alignment with an end of the window light blocking pattern WBM. For example, the end of the reinforcement film IF1 may be aligned with the end of the window light blocking pattern WBM in a vertical direction. Alternatively, the end of the reinforcement film IF1 may not be aligned to the end of the window light blocking pattern WBM in a vertical direction For example, referring to FIG. 3B, the width of the pad area PDA may be greater than the width of the bezel area BZA. Alternatively, the width of the pad area PDA may be equal to or smaller than the width of the bezel area BZA.

Figure 3C:
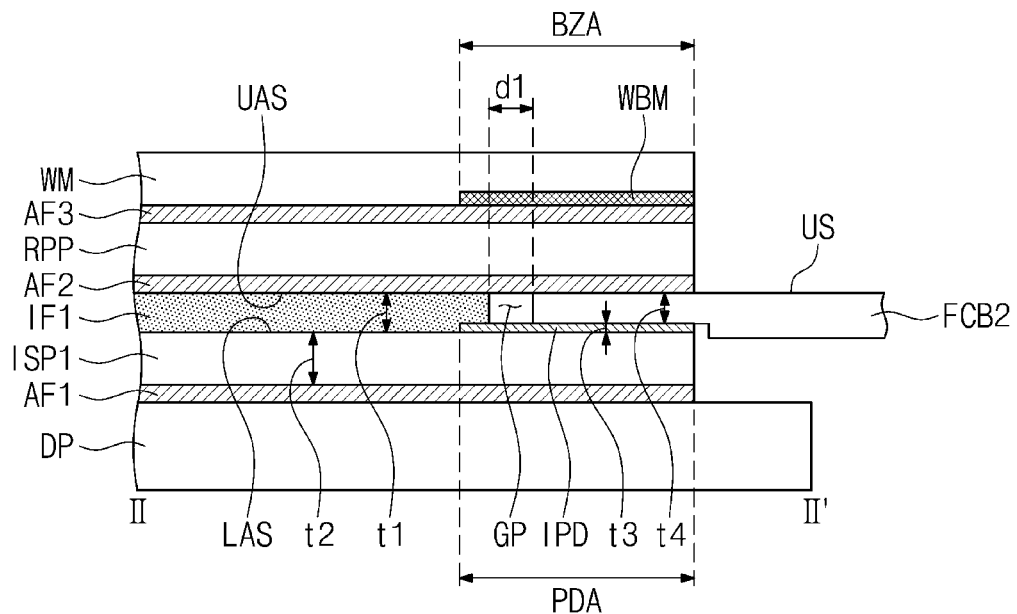
FIG. 3C is a cross-sectional view taken along line II-IF of FIG. 1B according to another exemplary embodiment of the invention.

FIG. 3C is a cross-sectional view taken along line II-IF of FIG. 1B according to another exemplary embodiment. Referring to FIG. 3C, the end of the reinforcement film IF1 may be disposed inside the bezel area BZA. In this case, the air gap GP is disposed inside the bezel area BZA. The window light blocking pattern WBM may be disposed within the bezel area BZA. For example, the end of the reinforcement film IF1 may partially overlap the end of the window light blocking pattern WBM in a vertical direction.

The width of the pad area PDA may be less than or equal to that of the bezel area BZA. Referring to FIG. 3C, the width of the bezel area BZA may be substantially the same as that of the pad area PDA. Hereinafter, referring to FIGS. 3D and 3E, the case in which the width of the pad area PDA is less than that of the bezel area BZA will be described as an exemplary embodiment.

Figure 3D:
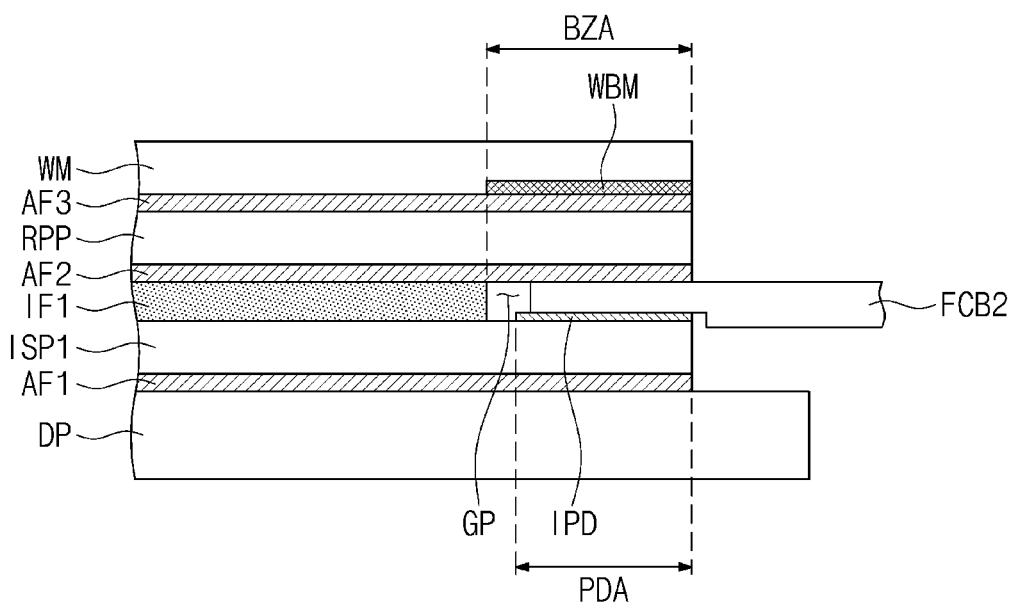
FIG. 3D is a cross-sectional view taken along line II-IF of FIG. 1B according to another exemplary embodiment of the invention.

FIG. 3D is a cross-sectional view taken along line II-IF of FIG. 1B according to another exemplary embodiment. Referring to FIG. 3D, the width of the pad area PDA is less than the width of the bezel area BZA. In this case, the air gap GP may partially overlap the bezel area BZA in a vertical direction.

The reinforcement film IF1 may not overlap the second flexible circuit board FCB2 in a vertical direction. In an exemplary embodiment, the reinforcement film IF1 may be spaced a predetermined distance from the second flexible circuit board FCB2 in a horizontal direction. An air gap GP may be formed between the reinforcement film IF1 and the second flexible circuit board FCB2 by separating the reinforcement film IF1 from the second flexible circuit board FCB2. The air gap GP may be formed between the polarizing film RPP from the input sensing panel ISP1 between the end of the reinforcement film IF1 and the end of the second flexible circuit board FCB2. The position of the air gap GP is substantially constantly maintained by the reinforcement film IF1 to have a substantially constant form.

In an exemplary embodiment, an end of the reinforcement film IF1, which is adjacent to the pad area PDA, may be disposed outside the bezel area BZA, and an end of the second flexible circuit board FCB2 may be disposed inside the bezel area BZA. Thus, the air gap GP may partially overlap the window light blocking pattern WBM in a vertical direction.

When the reinforcement film IF1 is not used, the air gap GP may be non-uniformly and irregularly defined between the polarizing film RPP and the input sensing panel ISP1. Thus, the bezel area BZA must be increased in width to entirely cover the air gap GP. However, when the reinforcement film IF1 is used in accordance with the principles and exemplary embodiments of the invention to define the air gap GP at a predetermined position, the air gap GP may be substantially uniformly and regularly defined between the polarizing film RPP and the input sensing panel ISP1. Thus, the bezel area BZA does not need to be increased in width to entirely cover the air gap GP, but may be reduced in width. As a result, the transmission area TA of the display device DD may be increased such that the display device DD may have a wider display area.

Figure 3E:
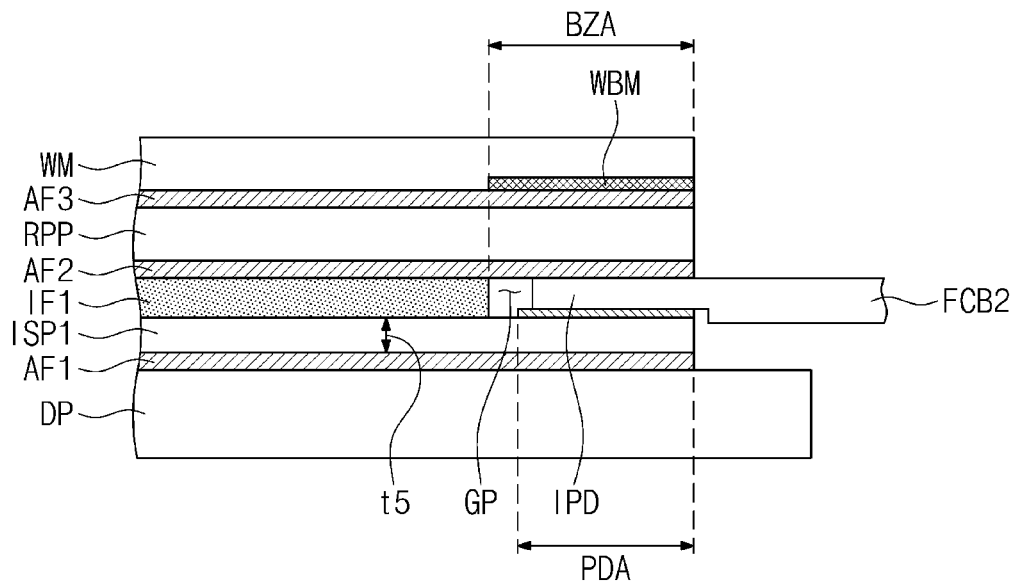
FIG. 3E is a cross-sectional view taken along line II-IF of FIG. 1B according to another exemplary embodiment of the invention.

FIG. 3E is a cross-sectional view taken along line II-IF of FIG. 1B according to another exemplary embodiment. Referring to FIG. 3E, the input sensing panel ISP1 may have a fifth thickness t5. The fifth thickness t5 of the input sensing panel ISP1 of FIG. 3E may be less than the second thickness t2 of the input sensing panel ISP1 of FIG. 3B. The fifth thickness t5 of the input sensing panel ISP1 may have a value between about 22.5 µm and about 27.5 µm. For example, as the thickness of the input sensing panel ISP1 decreases, the thickness of the display device DD may be reduced. For example, the fifth thickness t5 of the input sensing panel may vary according to products to which the display device DD is applied.

Figure 3F:
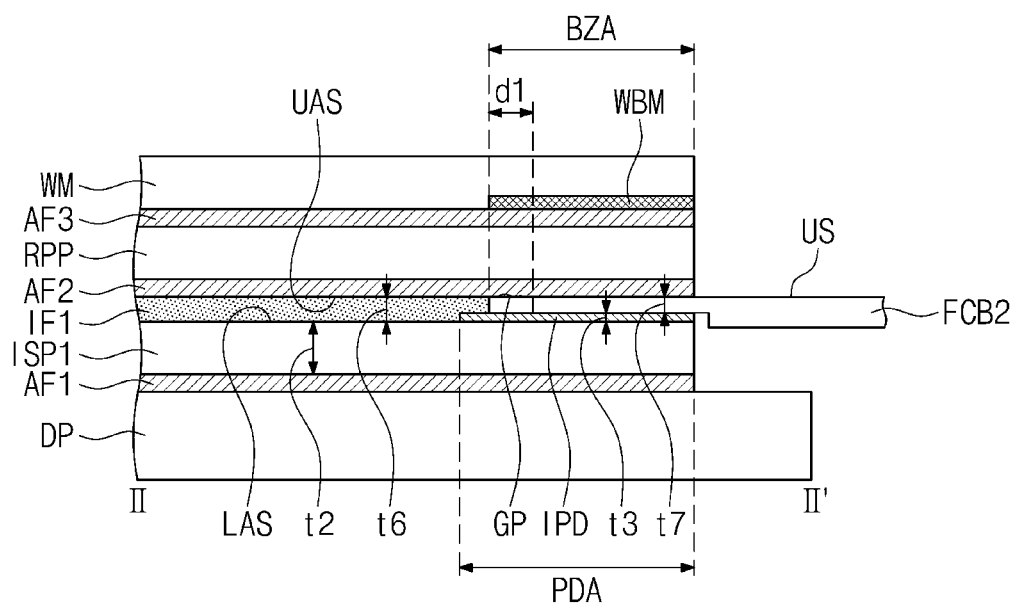
FIG. 3F is a cross-sectional view taken along line II-IF of FIG. 1B according to yet another exemplary embodiment of the invention.

FIG. 3F is a cross-sectional view taken along line II-IF of FIG. 1B according to another exemplary embodiment. Referring to FIG. 3F, the thickness of the reinforcement film IF1 may vary according to the thickness of the second flexible circuit board FCB2. The second flexible circuit board FCB2 of FIG. 3F may have a thickness less than that of the second flexible circuit board FCB2 of FIG. 3B. For example, a seventh thickness t7 of the second flexible circuit board FCB2 of FIG. 3F may be less than the fourth thickness t4 of the second flexible circuit board FCB2 of FIG. 3B.

When the thickness of the second flexible printed circuit board decreases from the fourth thickness t4 to the seventh thickness t7, the thickness of the reinforcement film IF1 may also decrease. For example, the reinforcement film IF1 may have a sixth thickness t6 less than the first thickness t1 (referring to FIG. 3C). In an exemplary embodiment, the sixth thickness t6 of the reinforcement film IF1 may be about 20 µm to about 25 µm.

Figure 4A:
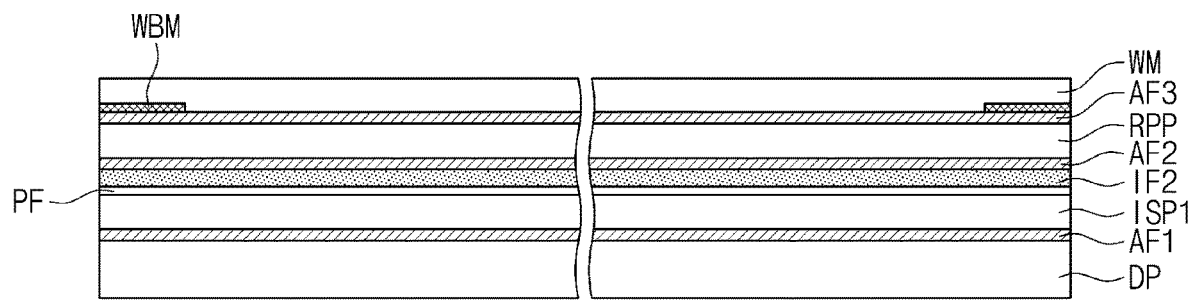
FIG. 4A is a cross-sectional view of another exemplary embodiment of a display device constructed according to the principles of the invention.
Figure 4B:
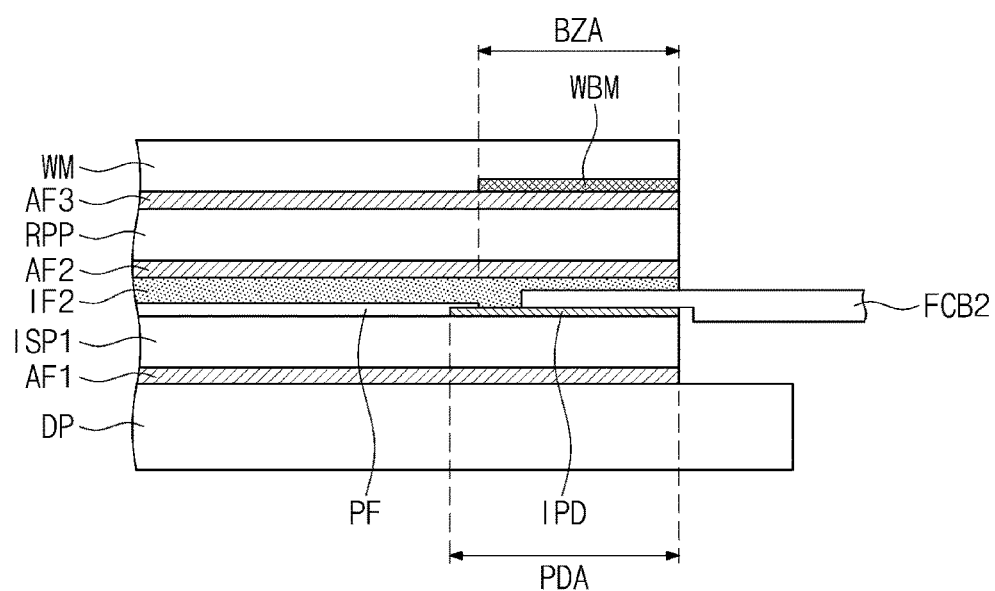
FIG. 4B is a partial enlarged cross-sectional view of the display device of FIG. 4A.

FIG. 4A is a cross-sectional view of the display device according to an exemplary embodiment, and FIG. 4B is a partial enlarged cross-sectional view of the display device according to an exemplary embodiment. Referring to FIGS. 4A and 4B, the same components as those of FIGS. 1A to 3F will be designated by the same reference numeral, and their detailed descriptions will be omitted to avoid redundancy.

Referring to FIGS. 4A and 4B, the display device according to an exemplary embodiment may include a protective layer PF covering the top surface of the input sensing panel ISP1 and a reinforcement film IF2 on the protective layer PF.

The protective layer PF may protect the input sensing panel ISP1 from moisture/oxygen or protect the input sensing panel from foreign substances such as dust particles. The protective layer PF may include an insulating material. For example, the protective layer PF may include an organic insulating material and an inorganic insulating material. The protective layer PF may include a silicon nitride layer, a silicon oxy nitride layer, a silicon oxide layer, a titanium oxide layer, an aluminum oxide layer, an acrylic organic layer, or the like.

The protective layer PF may partially cover the pads IPD. For example, the protective layer PF may partially overlap the pads IPD. For example, the width of the pad area PDA may be greater than that of the bezel area BZA. Alternatively, the width of the pad area PDA may be less than that of the bezel area BZA. For example, the protective layer PF may partially overlap the window light blocking pattern WBM.

The pads IPD exposed by the protective layer PF may be bonded to the second flexible circuit board FCB2. The second flexible circuit board FCB2 may be disposed on the pad area PDA. The second flexible circuit board FCB2 may not overlap the protective layer PF. For example, an end of the second flexible circuit board FCB2 and an end of the protective layer PF may be spaced apart from each other by a predetermined distance inside the pad area PDA.

The reinforcement film IF2 may cover the protective layer PF and a portion of the second flexible circuit board FCB2. The reinforcement film IF2 may cover the protective layer PF, a portion of the pads IPD, which is exposed by the protective layer PF, and the second flexible circuit board FCB2 bonded to the pads IPD on the pad area PDA. For example, the reinforcement film IF2 may entirely cover the pad area PDA of the input sensing panel ISP1.

In an exemplary embodiment, the reinforcement film IF2 may include an optically clear adhesive (OCA). For example, the reinforcement film IF2 may have adhesiveness, and a separate adhesive film may not be required to bond the reinforcement film IF2 to the top surface of the input sensing panel ISP1. For example, the reinforcement film IF2 may be directly attached to the top surface of the input sensing panel ISP1

The reinforcement film IF2 may not be limited to the optically clear adhesive (OCA). For example, when the reinforcement film IF2 is attached on the input sensing panel ISP1 by a laminating method, the reinforcement film IF2 may be formed of any material that is optically transparent.

An anti-reflection unit RPP may be disposed on the reinforcement film IF2. In an exemplary embodiment, the anti-reflection unit RPP may include a polarizing film. The anti-reflection unit RPP may further include a protective film and other functional films. Hereinafter, the polarizing film is shown for convenience of description, and the polarizing film and the anti-reflection unit RPP are expressed by the same reference numeral. The second adhesive film AF2 may be disposed between the polarizing film RPP and the reinforcement film IF2. Thus, the polarizing film RPP may be bonded to the reinforcement film IF2 by the second adhesive film AF2.

Referring to FIG. 4B, the polarizing film RPP may entirely cover the reinforcement film IF2. In an exemplary embodiment, the thickness of the reinforcement film IF2 may be about 20 µm to about 30 µm. In an exemplary embodiment, the thickness of the input sensing panel ISP1 may be about 20 µm to about 45 µm. To prevent the display device DD from increasing in overall thickness due to the reinforcement film IF2, the input sensing panel ISP1 may have the thickness between about 22.5 µm and about 27.5 µm. The thickness of each of the reinforcement film IF2 and the input sensing panel ISP1 is not limited thereto and thus may vary according to products to which the display device DD is applied.

In this example, the reinforcement film IF2 may have an elastic modulus greater than the polarizing film RPP. For example, a stepped portion is formed by the second flexible circuit board FCB2 may have a stepped portion such that an air gap may be formed between the polarizing film RPP and the input sensing panel ISP1. However, when the reinforcement film IF2 having the large elastic modulus entirely covers the protective layer PF and the second flexible circuit board FCB2, an air gap may not be formed between the polarizing film RPP and the input sensing panel ISP1. In more detail, when the reinforcement film IF2 is not provided, the air gap may be non-uniformly and irregularly defined between the polarizing film RPP and the input sensing panel ISP1. However, when the reinforcement film IF2 having the large elastic modulus entirely covers the protective layer PF and the second flexible circuit board FCB2 in accordance with the principles and exemplary embodiments of the invention, the air gap may not be formed between the polarizing film RPP and the input sensing panel ISP1 by the reinforcement film IF2. Further, even if an air gap is formed between the polarizing film RPP and the input sensing panel ISP1, the air gap may be reduced in size by using the reinforcement film IF2 having a large elastic modulus, such as described below in reference to the exemplary embodiment or FIG. 4C.

Figure 4C:
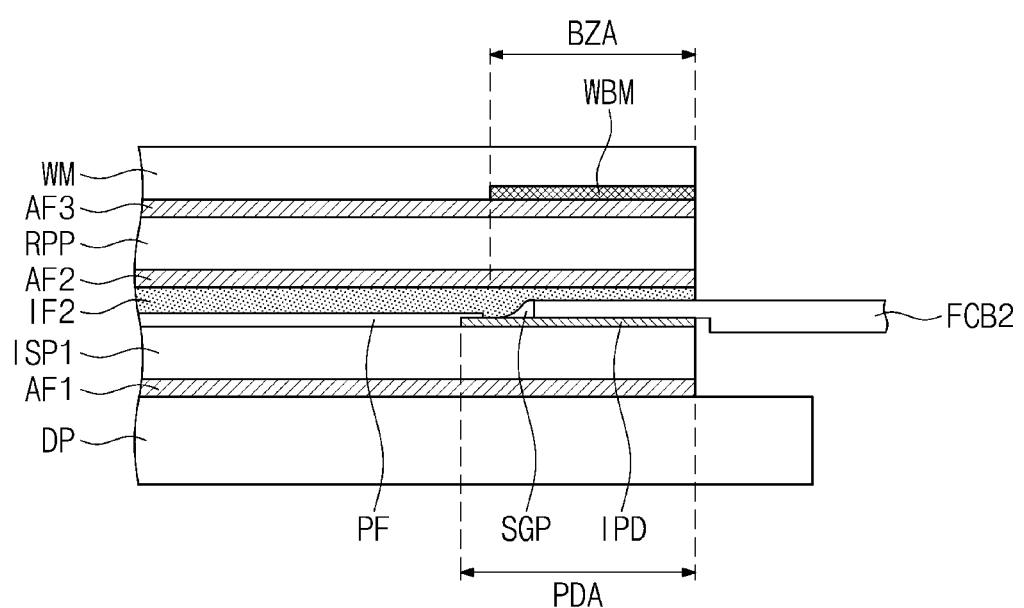
FIG. 4C is a partial enlarged cross-sectional view of the display panel of FIG. 4A according to another exemplary embodiment of the invention.

FIG. 4C is a partial enlarged cross-sectional view of the display panel according to an exemplary embodiment. Referring to FIG. 4C, an air gap SGP may be formed between the reinforcement film IF2 and the input sensing panel ISP1. However, since the reinforcement film IF2 has an elastic modulus greater than that of the polarizing film RPP, the air gap SGP formed between the reinforcement film IF2 and the input sensing panel ISP1 may have a size less than that of the air gap formed when the polarizing film RPP is disposed directly above the protective layer PF and the second flexible circuit board FCB2.

For example, when the reinforcement film IF2 is provided, the air gap SGP may have a small size, and the width of the bezel area BZA may not have to increase so as to cover the air gap SGP. As a result, the bezel area BZA for covering the air gap SGP may be reduced in width at the portion on which the pad area PDA is provided.

Figure 5A:
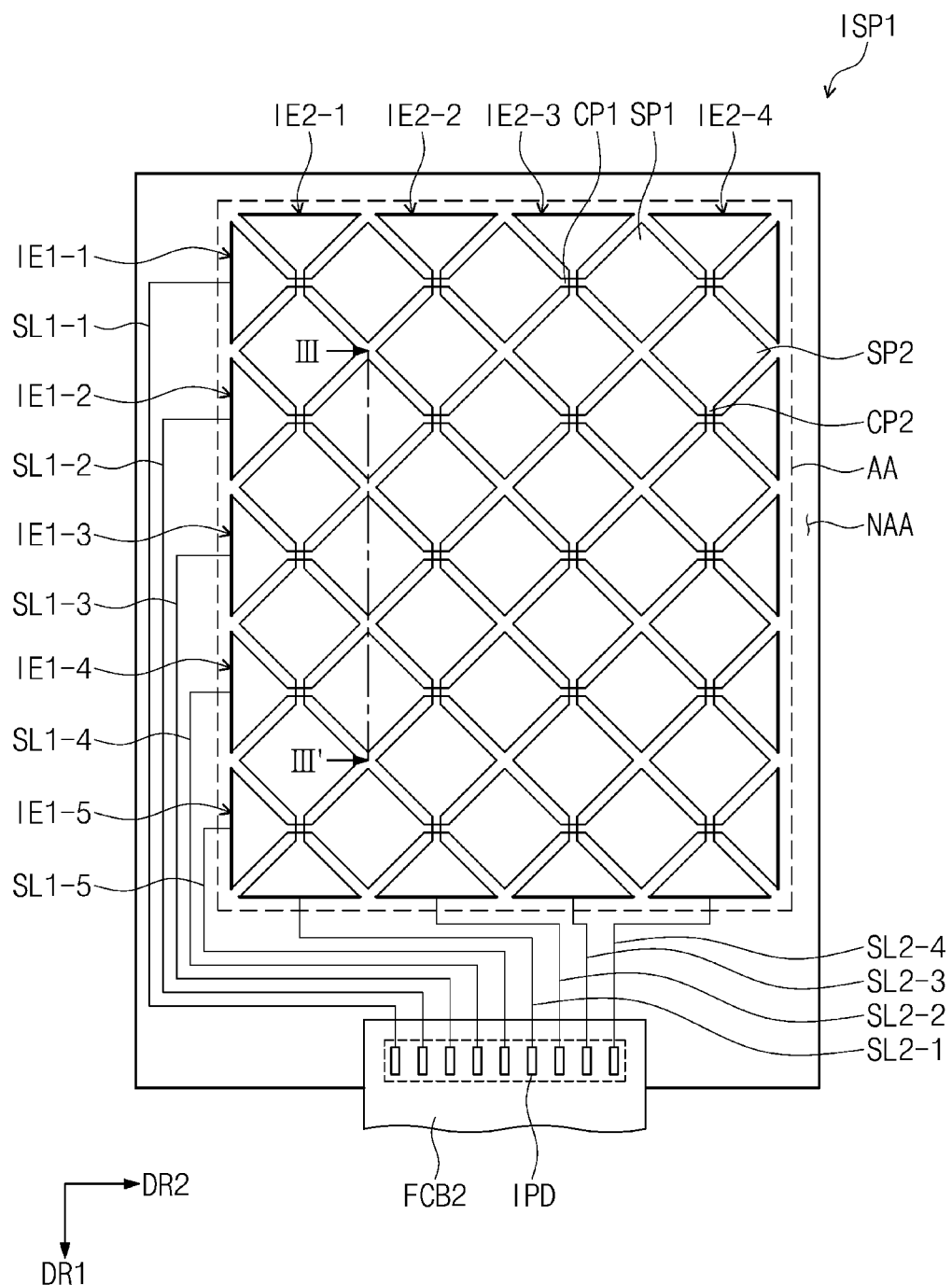
FIG. 5A is a plan view illustrating an exemplary embodiment of a configuration of an input sensing panel.
Figure 5B:
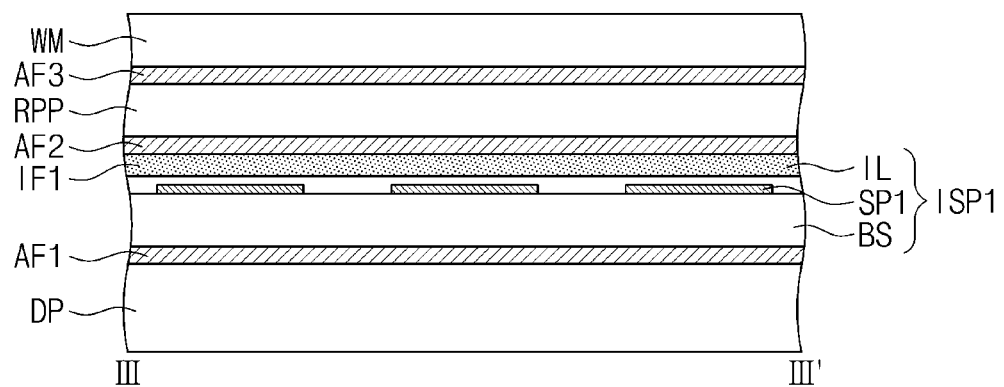
FIG. 5B is a cross-sectional view taken along line of FIG. 5A.

FIG. 5A is a plan view the input sensing panel according to an exemplary embodiment, and FIG. 5B is a cross-sectional view taken along line of FIG. 5A. Referring to FIG. 5B, the same components as those of FIGS. 3B and 4C will be designated by the same reference numeral, and their detailed descriptions will be omitted to avoid redundancy.

Referring to FIGS. 5A and 5B, the input sensing panel ISP1 according to an exemplary embodiment may include first sensing electrodes IE1-1 to IE1-5, first signal lines SL1-1 to SL1-5 connected to the first sensing electrodes IE1-1 to IE1-5, second sensing electrode IE2-1 to IE2-4, and second signal lines SL2-1 to SL2-4 connected to the second sensing electrodes IE2-1 to IE2-4.

The first sensing electrodes IE1-1 to IE1-5 and the second sensing electrodes IE2-1 to IE2-4 intersect. The first sensing electrodes IE1-1 to IE1-5 are arranged in the first direction DR1, and each of the first sensing electrodes IE1-1 to IE1-5 may extend in the second direction DR2.

Each of the first sensing electrodes IE1-1 to IE1-5 includes first sensor parts SP1 and first connection parts CP1 in the active area AA. Each of the second sensing electrodes IE2-1 to IE2-4 includes second sensor parts SP2 and second connection parts CP2 in the active area AA. Each of first sensor parts at both ends of the first electrode among the first sensor parts SP1 may have a smaller size than that of each of first sensor parts at a center. For example, each of first sensor parts at both ends of the first electrode may have about half size of each of the first sensor parts at a center. Each of second sensor parts at both ends of the second electrode among the second sensor parts SP2 may have a smaller size than that of the second sensor parts at a center. For example, each of second sensor parts at both ends of the second electrode may have about a half size of each of the second sensor parts at a center.

For example, FIG. 5A illustrates the shape of the first sensing electrodes IE1-1 to IE1-5 and the second sensing electrodes IE2-1 to IE2-4 of FIG. 5A as diamond shaped, but the exemplary embodiments are not be limited thereto. For example, the first sensing electrodes IE1-1 to IE1-5 and the second sensing electrodes IE2-1 to IE2-4 may have various other shapes, e.g., an elongate, bar shape, in which the sensor part and the connection part are not distinguished from each other. Alternatively, the first sensor parts SP1 and the second sensor parts SP2 may have different polygonal shapes. In other exemplary embodiments, the number of the first sensing electrodes and the number of the second sensing electrodes may vary.

The first sensor parts SP1 in each first sensing electrode may be arranged in the second direction DR2, and the second sensor parts SP2 in each second sensing electrode are arranged in the first direction DR1. Each of the first connection parts connects the first sensor parts SP1 adjacent to each other, and each of the second connection parts CP2 connects the second sensor parts SP2 adjacent to each other.

The first signal lines SL1-1 to SL1-5 are connected to ends of the first sensing electrodes IE1-1 to IE1-5, respectively. The second signal lines SL2-1 to SL2-4 are connected to ends of the second sensing electrodes IE2-1 to IE2-4. In an exemplary embodiment, the first signal lines SL1-1 to SL1-5 may also be connected to both ends of the first sensing electrodes IE1-1 to IE1-5, respectively. Further, the second signal lines SL2-1 to SL2-4 may be connected to both ends of the second sensing electrodes IE2-1 to IE2-4. The first signal lines SL1-1 to SL1-5 and the second signal lines SL2-1 to SL2-4 may be disposed in the peripheral area NAA.

The input sensing panel ISP1 may include pads IPD extending from ends of the first signal lines SL1-1 through SL1-5 and the second signal lines SL2-1 through SL2-4 and disposed in the peripheral area NAA.

Referring to FIG. 5B, the input sensing panel ISP1 may include a base layer BS, a conductive layer, and an insulating layer IL. The base layer BS may include an optically transparent plastic material. In an exemplary embodiment, the base layer BS may include a cyclic olefin polymer (COP) material.

A conductive layer may be disposed on the base layer BS. In an exemplary embodiment, the conductive layer may include the first sensing part SP1 and the second sensing part SP2. The conductive layer may have a single layer structure. Alternatively, the conductive layer may have a multilayer structure. The conductive layer having the single-layer structure may include a metal layer or a transparent conductive layer. The metal layer may be formed of, e.g., molybdenum, silver, titanium, copper, aluminum, and an alloy thereof. The transparent conductive layer may include transparent conductive oxide such as indium tin oxide (ITO), indium zinc oxide (IZO), zinc oxide (ZnO), and indium tin zinc oxide (ITZO). In addition, the transparent conductive layer may include a conductive polymer such as conductive polymers such as PEDOT, metal nanowires, graphene, or the like.

The conductive layer having the multilayer structure may include multilayer metal layers. The multilayer metal layers may have a 3-layer structure of titanium/aluminum/titanium. The conductive layer having the multilayer structure may include at least one metal layer and at least one transparent conductive layer. The sensing electrodes including the metal layer may have a mesh shape as described below to prevent the user from visually recognizing the internal structure.

The insulating layer IL may have a single or multi-layered structure. The insulating layer IL may include, e.g., an inorganic film, an organic film, or a composite material. The inorganic layer may include at least one of oxide, titanium oxide, silicon oxide, silicon oxide nitride, zirconium oxide, or hafnium oxide. The organic layer may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyamide-based resin, or a perylene-based resin.

Referring to FIG. 5B, the reinforcement film IF1 may be disposed on the insulating layer IL of the input sensing unit.

Figure 6A:
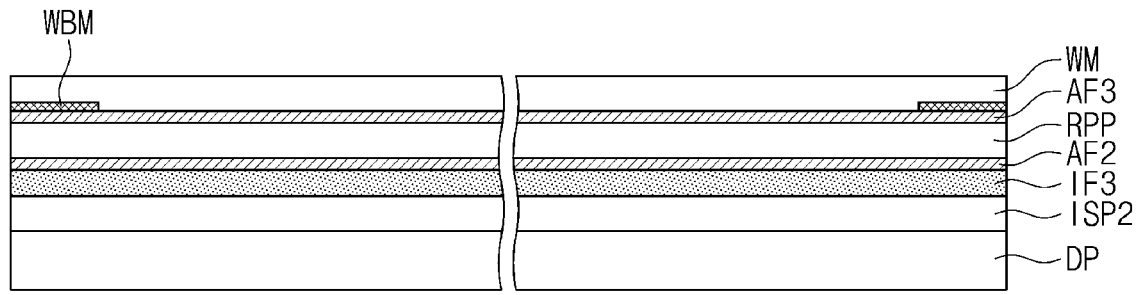
FIG. 6A is a cross-sectional view of another exemplary embodiment of a display device constructed according to the principles of the invention.
Figure 6B:
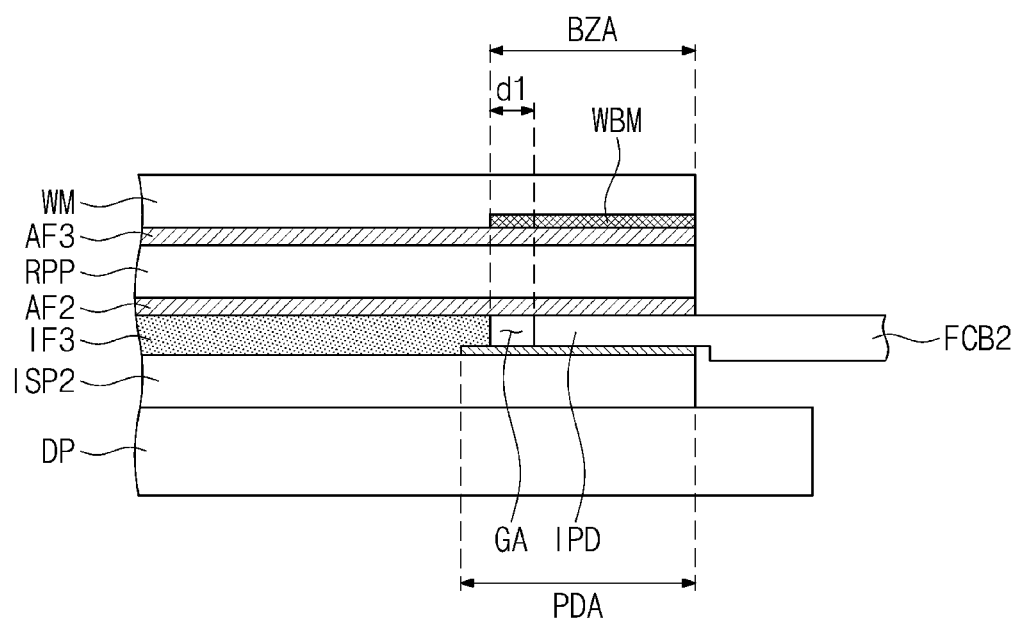
FIG. 6B is a partial enlarged cross-sectional view of the display device according to an exemplary embodiment of the invention.

FIG. 6A is a cross-sectional view of the display device according to an exemplary embodiment, and FIG. 6B is a partial enlarged cross-sectional view of the display device according to an exemplary embodiment. Referring to FIGS. 6A and 6B, the same components as those of FIGS. 3A to 4C will be designated by the same reference numeral, and their detailed descriptions will be omitted to avoid redundancy.

Referring to FIGS. 6A and 6B, the input sensing unit ISP2 of the display device may be directly disposed on the display panel DP. The direct disposition means that an adhesive film is not disposed between the input sensing unit ISP2 and the display panel DP. For example, the input sensing unit ISP2 may be disposed on the display panel DP by a continuous process. For example, the input sensing unit ISP2 may be an input sensing layer.

A reinforcement film IF3 may be disposed on a top surface of the input sensing layer ISP2. For example, the reinforcement film IF3 may be formed to partially cover the pad area PDA of the input sensing layer ISP2. Alternatively, the reinforcement film IF3 may not be formed on the pad area PDA of the input sensing layer ISP2. A plurality of pads IPD bonded to the second flexible circuit board FCB2 may be disposed on one side of the top surface of the input sensing layer ISP2. For example, an area on which the pads IDP are disposed may be defined as the pad area PDA.

The input sensing layer ISP2 is bonded to the second flexible circuit board FCB2 on the pad area PDA. The reinforcement film IF3 may be disposed to cover the top surface of the input sensing layer ISP2 on the remaining area except for the pad area PDA. The reinforcement film IF3 may not overlap the second flexible circuit board FCB2. In an exemplary embodiment, the reinforcement film IF3 may be spaced apart from the second flexible circuit board FCB2 by a predetermined distance. The spaced distance between the reinforcement film IF3 and the second flexible circuit board FCB2 may be the first distance d1.

An air gap GP may be formed between the reinforcement film IF3 and the second flexible circuit board FCB2, and may have a width corresponding to the first distance d1 between the reinforcement film IF3 from the second flexible circuit board FCB2. Since the reinforcement film IF3 is fixed at the first distance d1 from an end of the second flexible circuit board FCB2, the air gap GP may have a substantially constant width along the end of the second flexible circuit board FCB2.

In an exemplary embodiment, the reinforcement film IF3 may include an optically clear adhesive (OCA). For example, since the reinforcement film IF3 has adhesiveness, an additional adhesive film may not be required to bond the reinforcement film IF3 to the top surface of the input sensing layer ISP2.

The reinforcement film IF3 may not be limited to the optically clear adhesive (OCA). For example, when the reinforcement film IF3 is attached on the input sensing layer ISP2 by a laminating method, the reinforcement film IF3 may be formed of any material that is optically transparent.

An anti-reflection unit RPP may be disposed on the reinforcement film IF3. In an exemplary embodiment, the anti-reflection unit RPP may include a polarizing film. The anti-reflection unit RPP may further include a protective film and other functional films. Hereinafter, the polarizing film is shown for convenience of description, and the polarizing film and the anti-reflection unit RPP are expressed by the same reference numeral. The second adhesive film AF2 may be disposed between the polarizing film RPP and the reinforcement film IF3. Thus, the polarizing film RPP may be bonded to the reinforcement film IF3 by the second adhesive film AF3. The top surface of the reinforcement film IF3 may be bonded to the second adhesive film AF2, and a bottom surface of the reinforcement film IF3 may be bonded to the top surface of the input sensing layer ISP2.

The polarizing film RPP may entirely cover the reinforcement film IF3, and the polarizing film RPP may cover the second flexible circuit board FCB2 on the pad area PDA. For example, the polarizing film RPP may partially overlap the second flexible circuit board FCB2.

For example, the thickness of the reinforcement film IF3 may be equal to or greater than that of the second flexible circuit board FCB2. In an exemplary embodiment, the thickness t1 of the reinforcement film IF3 may be about 20 μm to about 30 μm.

The distance between the bottom surface of the polarizing film RPP and the top surface of the input sensing layer ISP2 may be substantially constantly maintained on the pad area PDA and the remaining area except for the pad area PDA. For example, even if the second flexible circuit board FCB2 has a stepped portion on the input sensing layer ISP2, the reinforcement film IF3 may be used to maintain a substantially constant distance between the bottom surface of the polarizing film RPP and the top surface of the input sensing layer ISP2.

For example, an air gap GP between the polarizing film RPP and the input sensing layer ISP2 may be defined between an end of the reinforcement film IF3 and the end of the second flexible circuit board FCB2. For example, a position of the air gap GP may be defined by the reinforcement film IF3. When the reinforcement film IF3 is not used between the polarizing film RPP and the input sensing layer ISP2, the air gap GP may be non-uniformly and irregularly formed between the polarizing film RPP and the input sensing layer ISP2. In this case, the bezel area BZA has to increase in width to cover the air gap GP. However, when the air gap GP is formed at a predetermined position by the reinforcement film IF3 in accordance with the principles and exemplary embodiments of the invention, the bezel area BZA may be reduced in width. As a result, the transmission area TA of the display device DD may be increased such that the display device DD may have a wider display area.

Figure 7A:
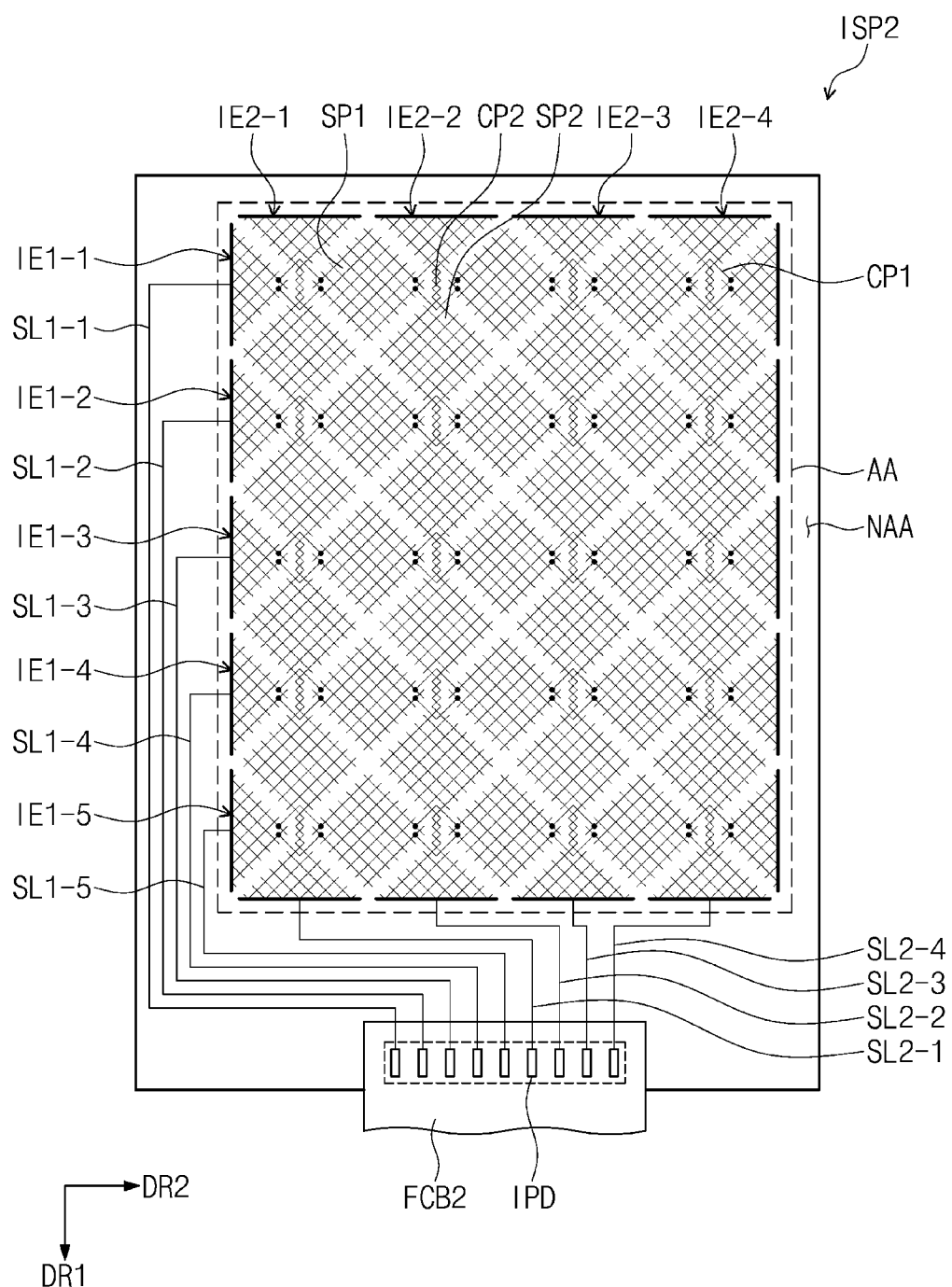
FIG. 7A is a plan view illustrating another exemplary embodiment of a configuration of an input sensing layer.
Figure 7B:
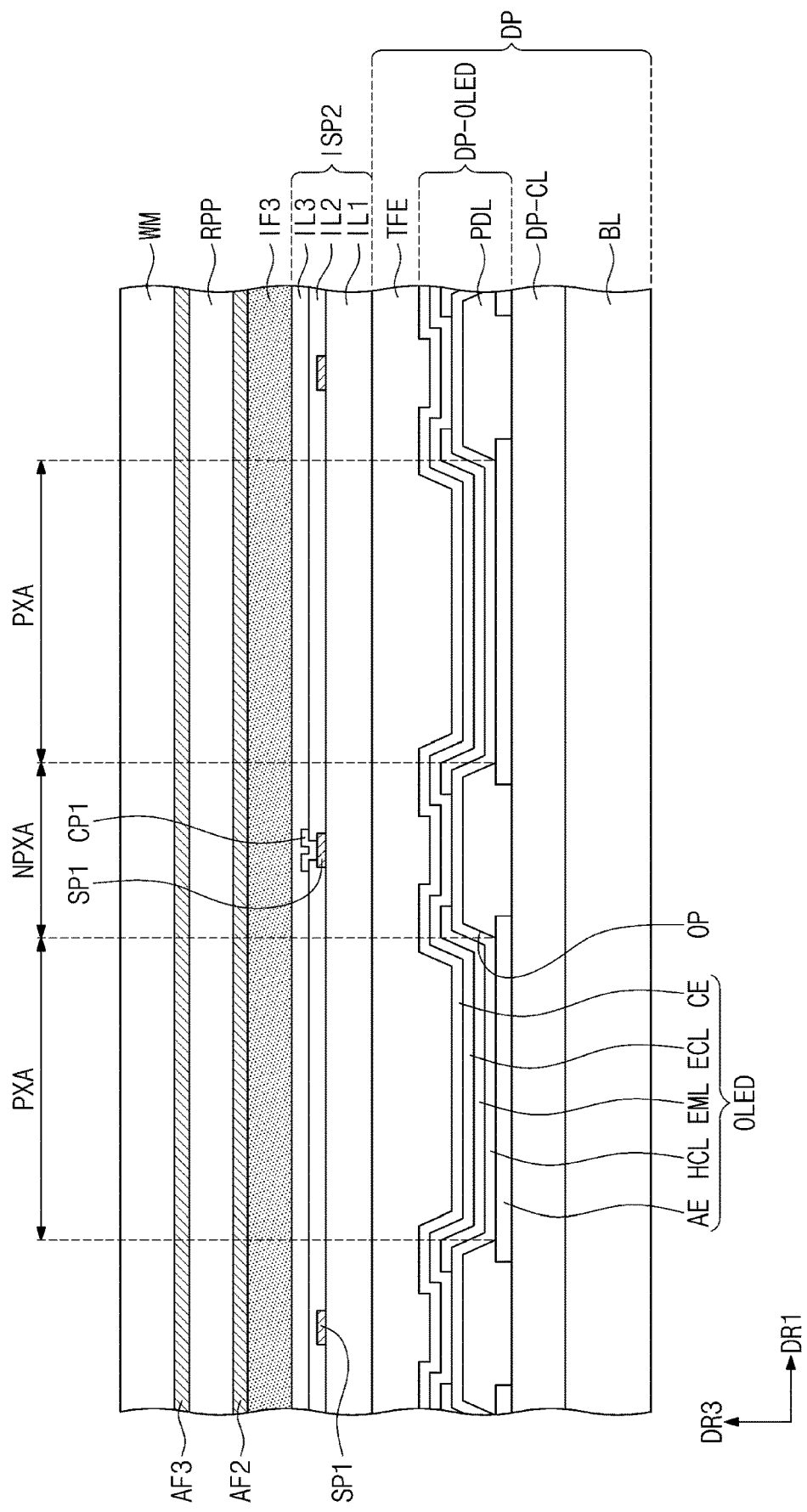
FIG. 7B is a cross-sectional view of another exemplary embodiment of a display device constructed according to the principles of the invention.

FIG. 7A is a plan view of the input sensing layer according to an exemplary embodiment, and FIG. 7B is a cross-sectional view of the display device according to an exemplary embodiment. Referring to FIG. 7A, the same components as those of FIG. 5A will be designated by the same reference numeral, and their detailed descriptions will be omitted to avoid redundancy. Referring to FIG. 7B, the same components as those of FIG. 5B will be designated by the same reference numeral, and their detailed descriptions will be omitted to avoid redundancy.

Referring to FIGS. 7A and 7B, the input sensing layer ISP2 may include first sensing electrodes IE1-1 to IE1-5 and second sensing electrodes IE2-1 to IE2-4. The first sensing electrodes IE1-1 to IE1-5 and the second sensing electrodes IE2-1 to IE2-4 may have a mesh shape. Since the first sensing electrodes IE1-1 to IE1-5 and the second sensing electrodes IE2-1 to IE2-4 have the mesh shape, parasitic capacitances between electrodes AE and CE of the display panel DP may be reduced. For example, since the first sensing electrodes IE1-1 to IE1-5 and the second sensing electrodes IE2-1 to IE2-4 do not overlap a light emitting layer EML, the first sensing electrodes IE1-1 to IE1-5 and the second sensing electrodes IE2-1 to IE2-4 may not be recognized.

Each of the first sensing electrodes IE1-1 to IE1-5 and the second sensing electrodes IE2-1 to IE2-4 having the mesh shape may be formed of, e.g., silver, aluminum, copper, chromium, nickel, or titanium. For example, each of the first sensing electrodes IE1-1 to IE1-5 and the second sensing electrodes IE2-1 to IE2-4 having the mesh shape may be formed of any conductive material which is processed at a low temperature. When the input sensing layer ISP2 is formed in a continuous process, the organic light emitting diodes OLED may be protected from being damaged.

Referring to FIG. 7A, the display panel DP may include a base layer BL, a circuit element layer DP-CL disposed on the base layer BL, a display element layer DP-OLED, and a thin film encapsulation layer TFE. In an exemplary embodiment, the display panel DP may further include functional layers such as the anti-reflection layer, a reflective index adjusting layer, and the like.

The base layer BL may include a synthetic resin film. A synthetic resin layer is disposed on a working substrate used for manufacturing the display panel DP. Further, a conductive layer, an insulating layer, and the like may be disposed on the synthetic resin layer. When the working substrate is removed, the synthetic resin layer may correspond to the base layer BL. The synthetic resin layer may be a polyimide resin layer, and the material. For example, the base layer BL may include a glass substrate, a metal substrate, and an organic/inorganic composite substrate.

The circuit element layer DP-CL may include at least one insulating layer and a circuit element. Hereinafter, the insulating layer provided in the circuit element layer DP-CL may be called an intermediate insulating layer. The intermediate insulating layer may include at least one intermediate inorganic film and at least one intermediate organic film. The circuit element may include the signal line and the driving circuit of the pixel. The circuit element layer DP-CL may be formed through a process of forming an insulating layer, a semiconductor layer, and a conductive layer by coating or deposition and a process of patterning the insulating layer, the semiconductor layer, and the conductive layer by a photolithography process.

The display element layer DP-OLED may include a pixel defining layer PDL and an organic light emitting diode OLED. The pixel defining layer PDL may include an organic material. The first electrode AE may be disposed on the circuit element layer DP-CL. The pixel defining layer PDL may be disposed on the first electrode AE. An opening OP may be defined in the pixel defining layer PDL. The opening OP of the pixel defining layer PDL may expose at least a portion of the first electrode AE. In an exemplary embodiment, the pixel defining layer PDL may be omitted.

The display panel DP may include emission areas PXA and a non-emission area NPXA that is adjacent to the emission areas PXA. The non-emission area NPXA may surround the emission areas PXA. In an exemplary embodiment, each of the emission areas PXA may correspond to a portion of the first electrode AE exposed by the opening OP.

In an exemplary embodiment, the emission area PXA may overlap at least one of the first and second transistors T1 and T2. The opening OP may be widened, and the first electrode EL1 and a light emitting layer EML that will be described later may also be more widened.

A hole control layer HCL may be commonly disposed on the emission area PXA and the non-emission area NPXA. The light emitting layer EML may be disposed on the hole control layer HCL. The light emitting layer EML may be disposed on an area corresponding to the opening OP. For example, the light emitting layer EML may be separated from each of the emission areas PXA. Further, the emission EML may include an organic material and/or an inorganic material. The emission layer EML may generate light having a predetermined color.

In an exemplary embodiment, the emission layer EML may be disposed on the each emission area PXA. For example, the emission layer EML may emit white light. Further, the emission layer EML may have a multilayer structure that is called a tandem.

An electronic control layer ECL may be disposed on the light emitting layer EML. For example, the electronic control layer ECL may be commonly disposed on the emission areas PXA and the non-emission area NPXA. A second electrode CE may be disposed on the electronic control layer ECL. The second electrode CE may be commonly disposed in the emission areas PXA.

The thin film encapsulation layer TFE may be disposed on the second electrode CE. The thin film encapsulation layer TFE may seal the display element layer DP-OLED. The thin film encapsulation layer TFE may include at least one insulating layer. The thin film encapsulation layer TFE according to an exemplary embodiment may include at least one inorganic film (hereinafter, referred to as an encapsulation inorganic film). The thin film encapsulation layer TFE according to an exemplary embodiment may include at least one organic layer (hereinafter, referred to as an encapsulation organic film) and at least one encapsulation inorganic film.

The encapsulation inorganic film may protect the display element layer DP-OLED from moisture/oxygen, and the encapsulation organic film protects the display element layer DP-OLED from foreign substances such as dust particles. The encapsulation inorganic layer may include, e.g., a silicon nitride layer, a silicon oxy nitride layer, a silicon oxide layer, a titanium oxide layer, or an aluminum oxide layer. The encapsulation organic layer may include an acrylic-based organic layer.

The input sensing layer ISP2 may include a base layer ILL first and second conductive layers disposed on the base layer ILL and first and second insulating layers IL2 and IL3 disposed on the base layer IL1. The base layer IL1 may include an inorganic material, for example, a silicon nitride layer. The inorganic film disposed at the uppermost side of the thin film encapsulation layer TFE may include silicon nitride. The silicon nitride layer and the base layer IL1 of the thin film encapsulation layer TFE may be disposed under different deposition conditions.

The first conductive layer is disposed on the base layer ILL The first conductive layer may include a first sensing part SP1, a second sensing part SP2, and a second connection part CP2. The second conductive layer is disposed on the first conductive layer. The second conductive layer may include a first connection part CP1. The first insulating layer IL2 is disposed between the first conductive layer and the second conductive layer. The first insulating layer IL2 spaces and separates the first conductive layer from the second conductive layer on the cross-section. A contact hole for partially exposing the first sensing part SP1 may be provided in the first insulating layer IL2, and the first connection unit CP1 may be connected to the first sensing part SP1 through the contact hole. The second insulating layer IL3 is disposed on the first insulating layer IL2. The second insulating layer IL3 may cover the second conductive layer. The second insulating layer IL3 protects the second conductive layer from the external environment.

The first sensor part SP1 does not overlap the emission areas PXA and overlaps the non-emission area NPXA. Mesh lines of the first sensor part SP1 may define a plurality of mesh holes. The mesh lines may have a three-layered structure of titanium, aluminum, and titanium. The mesh holes correspond to the emission areas PXA, respectively. However, the exemplary embodiments of the invention are not limited thereto. For example, each of the mesh holes may correspond to two or more emission areas PXA.

According to the principles and exemplary embodiments of the invention, in a display device in which an anti-reflection unit is disposed on the input sensing unit, the reinforcement film may be disposed between the input sensing unit and the anti-reflection unit to prevent an air gap from being non-uniformly and irregularly formed between the anti-reflection unit and the input sensing unit due to the thickness of flexible circuit board attached to the input sensing unit.

Therefore, the air gap is formed between the end of the reinforcement film and the end of the flexible circuit board so that the air gap in a predetermined shape by the reinforcement film, thereby preventing the bezel area from unnecessarily increasing in width to cover the air gap, and increasing the display area.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
a display panel to display an image;
an input sensor disposed on the display panel;
a flexible circuit board attached to the input sensor;
a compensation film disposed on the input sensor and spaced apart from the flexible circuit board; and
an anti-reflector disposed on the flexible circuit board and the compensation film,
wherein the compensation film has a thickness is greater than that of the flexible circuit board and less than or equal to a distance between the anti-reflector and the input sensor.

2. The display device of claim 1, wherein the input sensor comprises a pad to electrically connect to the flexible circuit board, and
the thickness of the compensation film is substantially the same as a sum of the thickness of the flexible circuit board and a thickness of the pad.

3. The display device of claim 1, wherein the compensation film comprises a reinforcement film that optionally comprises an optically clear adhesive.

4. The display device of claim 1, wherein the anti-reflector comprises a polarizing layer.

5. The display device of claim 1, wherein the input sensor comprises:
a base layer;
a conductive layer disposed on the base layer; and
an insulating layer covering the conductive layer.

6. The display device of claim 1, wherein the input sensor has a thickness of about 20 μm to about 45 μm.

7. The display device of claim 6, wherein the thickness of the compensation film is less than or equal to that of the input sensor.

8. The display device of claim 1, wherein the input sensor comprises a pad for electrically connecting with the flexible circuit board.

9. The display device of claim 8, wherein the pad comprises a portion overlapping the flexible circuit board and another portion overlapping the compensation film.

10. The display device of claim 1, further comprising a window on the anti-reflector.

11. The display device of claim 10, wherein:
the window comprises a window light blocking pattern disposed on a rear surface of the window, and
the window light blocking pattern overlaps the flexible circuit board.

12. The display device of claim 11, wherein the compensation film partially overlaps the window light blocking pattern.

13. The display device of claim 11, wherein the compensation film does not overlap the window light blocking pattern.

14. The display device of claim 1, further comprising an adhesive layer between the display panel and the input sensor to bond the input sensor to the display panel.

15. The display device of claim 1, wherein the input sensor has a top surface to which the flexible circuit board is attached and on which the compensation film is disposed.

16. A display device comprising:
a display panel to display an image;
an input sensor disposed on the display panel;
a flexible circuit board attached to the input sensor;
a compensation film on the flexible circuit board and the input sensor; and
an anti-reflector disposed on the compensation film,
wherein the compensation film comprises a material having an elastic modulus greater than that of the anti-reflector.

17. The display device of claim 16, further comprising a protective layer between the compensation film and the input sensor.

18. The display device of claim 17, wherein the compensation film comprises a reinforcement film that comprises an optically clear adhesive.

19. The display device of claim 17, wherein the anti-reflector comprises a polarizing layer.

20. The display device of claim 17, further comprising a window on the anti-reflector.

21. The display device of claim 17, further comprising an adhesive layer between the display panel and the input sensor to bond the input sensor to the display panel.

22. A display device comprising:
a display panel to display an image;
an input sensor disposed on the display panel;
a flexible circuit board attached to the input sensor;
a compensation film on the input sensor and spaced apart from the flexible circuit board;
an anti-reflector disposed on the flexible circuit board and the compensation film; and
a window including a window light blocking pattern disposed on the anti-reflector, wherein:
an end of the flexible circuit board and an end of the compensation film are spaced apart from each other by a gap, and
the window light blocking pattern at least partially overlaps the compensation film.

23. The display device of claim 22, wherein the gap has a substantially constant size.

24. A display device comprising:
a display panel to display an image;
an input sensor disposed on the display panel;
a flexible circuit board attached to the input sensor;
an optically clear adhesive disposed on the input sensor and spaced apart from the flexible circuit board; and
a polarizing layer disposed on the flexible circuit board and the optically clear adhesive,
wherein the input sensor comprises a pad for electrically connecting with the flexible circuit board,
wherein a gap may be disposed between an end of the optically clear adhesive and an end of the flexible circuit board and the gap overlaps with the polarizing layer.

* * * * *